(12) United States Patent
Mukhopadhyay et al.

(10) Patent No.: US 12,632,380 B2
(45) Date of Patent: May 19, 2026

(54) DATA STORAGE DEVICE AND METHOD FOR SELECTIVELY PERFORMING A PROGRAM-VERIFY OPERATION

(71) Applicant: Sandisk Technologies, Inc., Milpitas, CA (US)

(72) Inventors: Ankan Mukhopadhyay, Kolkata (IN); Soubhik Kayal, Kolkata (IN); Saikat Maji, Medinipur (IN)

(73) Assignee: Sandisk Technologies, Inc., Milpitas, CA (US)

( * ) Notice: Subject to any disclaimer, the term of this patent is extended or adjusted under 35 U.S.C. 154(b) by 25 days.

(21) Appl. No.: 18/939,779

(22) Filed: Nov. 7, 2024

(65) Prior Publication Data

US 2026/0127111 A1     May 7, 2026

(51) Int. Cl.
*G06F 12/00* (2006.01)
*G06F 12/02* (2006.01)

(52) U.S. Cl.
CPC ................................. *G06F 12/0246* (2013.01)

(58) Field of Classification Search
CPC ......................... G06F 12/0246; G11C 16/3427
USPC ......................................................... 711/103
See application file for complete search history.

(56) References Cited

U.S. PATENT DOCUMENTS

| | | | |
|---|---|---|---|
| 9,269,446 B1 | 2/2016 | Magia et al. | |
| 10,726,932 B2 | 7/2020 | Lee | |
| 11,972,815 B2 | 4/2024 | Zhang et al. | |
| 2005/0286299 A1* | 12/2005 | Tomita ............... | G11C 16/3454 |
| | | | 365/185.11 |
| 2020/0211650 A1* | 7/2020 | Lee .................... | G11C 16/0483 |
| 2021/0304009 A1* | 9/2021 | Bazarsky ................. | G06N 3/06 |
| 2022/0208286 A1 | 6/2022 | Ameen Beshari et al. | |
| 2023/0066972 A1 | 3/2023 | Lien et al. | |
| 2024/0055060 A1 | 2/2024 | Lien et al. | |
| 2024/0242764 A1 | 7/2024 | Xu et al. | |

FOREIGN PATENT DOCUMENTS

CN          118051917 A  *  5/2024  ............. G06F 21/64

* cited by examiner

*Primary Examiner* — Mardochee Chery
(74) *Attorney, Agent, or Firm* — Crowell & Moring LLP

(57) ABSTRACT

When a memory is considered to be relatively reliable, a data storage device can program the memory without performing a subsequent verify-read step. However, some memory cells may be known during the manufacturing of the data storage device to be difficult to program, and such memory cells can be identified in a predetermined list as requiring a verify-read step. Other memory cells may become difficult to program over time, and those memory cells can be identified in a dynamic list as requiring a verify-read step.

20 Claims, 6 Drawing Sheets

TO HOST

NON-VOLATILE
STORAGE SYSTEM

CONTROLLER   102

100

104   NON-VOLATILE
MEMORY

STORAGE MODULE
200

TO HOST

202   STORAGE
CONTROLLER

204

102   CONTROLLER    102   CONTROLLER    102   CONTROLLER

100   NVM   104        100   NVM   104        100   NVM   104

HOST   252   • • •   HOST   252   HIERARCHICAL STORAGE
SYSTEM
250

202   STORAGE
CONTROLLER   • • •   202   STORAGE
CONTROLLER   • • •

204   STORAGE
SYSTEM   • • •   204   STORAGE
SYSTEM   • • •

DATA STORAGE DEVICE AND METHOD FOR SELECTIVELY PERFORMING A PROGRAM-VERIFY OPERATION

BACKGROUND

In some data storage devices (e.g., solid-state drives (SSDs)), the programming of cells in the memory can be done using incremental step pulse programming, in which a read operation is performed after each applied programming pulse to verify that the memory cell was correctly programmed. If the memory cell was not correctly programmed, another programming pulse can be applied to the memory cell followed by another verify read. This can be repeated until the memory cell is correctly programmed or until a maximum number of programming attempts has been reached.

DETAILED DESCRIPTION

The following embodiments generally relate to a data storage device and method for selectively performing a program-verify operation. In one embodiment, a data storage device is provided comprising a memory and one or more processors. The one or more processors, individually or in combination, are configured to: read data from a portion of the memory, perform a read error handling operation on the data read from the portion of the memory; and in response to the read error handling operation being unsuccessful, identify, in a data structure stored in the data storage device, the portion of the memory as requiring a read verification operation be performed after attempting to program the portion of the memory.

In another embodiment, a method is provided that is performed in a data storage device comprising a memory. The method comprises: determining whether a logical wordline is identified in a static program verify data structure as requiring a read verification operation be performed after attempting to program the logical wordline; in response determining that the logical wordline is not identified in the static program verify data structure, determining whether the logical wordline is identified in a dynamic program verify data structure as requiring the read verification operation be performed after attempting to program the logical wordline; and in response determining that the logical wordline is not identified in the dynamic program verify data structure, programming the logical wordline without performing the read verification operation.

In yet another embodiment, a data storage device is provided comprising: a memory; and means for: determining whether a string of memory cells is identified is in a first data structure as requiring a read verification operation be performed after attempting to program the string of memory cells; in response determining that the string of memory cells is not identified in the first data structure, determining whether the string of memory cells is identified in a second data structure as requiring the read verification operation be performed after attempting to program the string of memory cells; and in response determining that the string of memory cells is not identified in the second data structure, programming the string of memory cells without performing the read verification operation.

Other embodiments are possible, and each of the embodiments can be used alone or together in combination. Accordingly, various embodiments will now be described with reference to the attached drawings.

Embodiments

The following embodiments relate to a data storage device (DSD). As used herein, a "data storage device" refers to a non-volatile device that stores data. Examples of DSDs include, but are not limited to, hard disk drives (HDDs), solid state drives (SSDs), tape drives, hybrid drives, etc. Details of example DSDs are provided below.

Figures 1A, 1B, 1C:
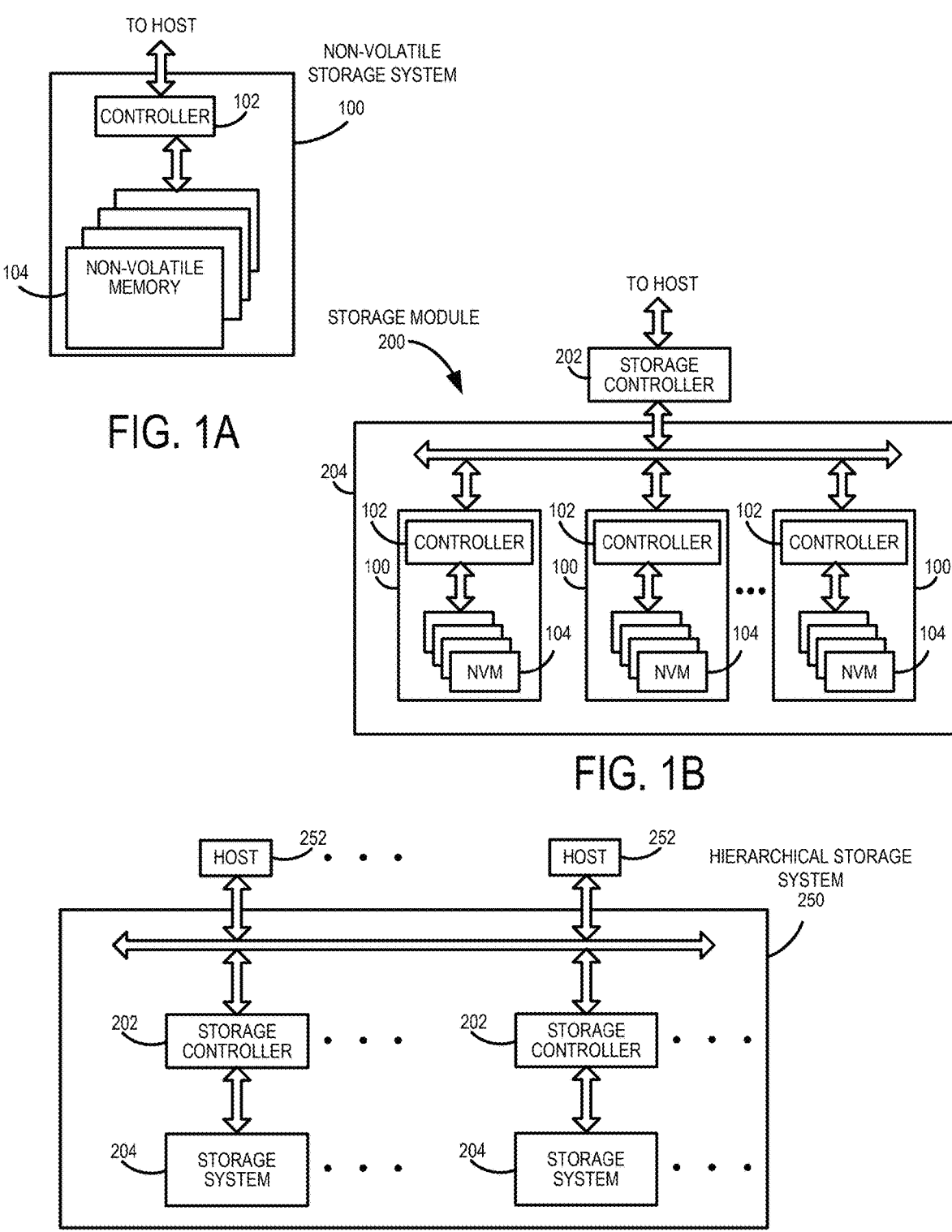
FIG. 1A is a block diagram of a data storage device of an embodiment.
FIG. 1B is a block diagram illustrating a storage module of an embodiment.
FIG. 1C is a block diagram illustrating a hierarchical storage system of an embodiment.

Examples of data storage devices suitable for use in implementing aspects of these embodiments are shown in FIGS. 1A-1C. It should be noted that these are merely examples and that other implementations can be used. FIG. 1A is a block diagram illustrating the data storage device 100 according to an embodiment. Referring to FIG. 1A, the data storage device 100 in this example includes a controller 102 coupled with a non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. The controller 102 interfaces with a host system and transmits command sequences for read, program, and erase operations to non-volatile memory die 104. Also, as used herein, the phrase "in communication with" or "coupled with" could mean directly in communication/coupled with or indirectly in communication/coupled with through one or more components, which may or may not be shown or described herein. The communication/coupling can be wired or wireless.

Figure 2A:
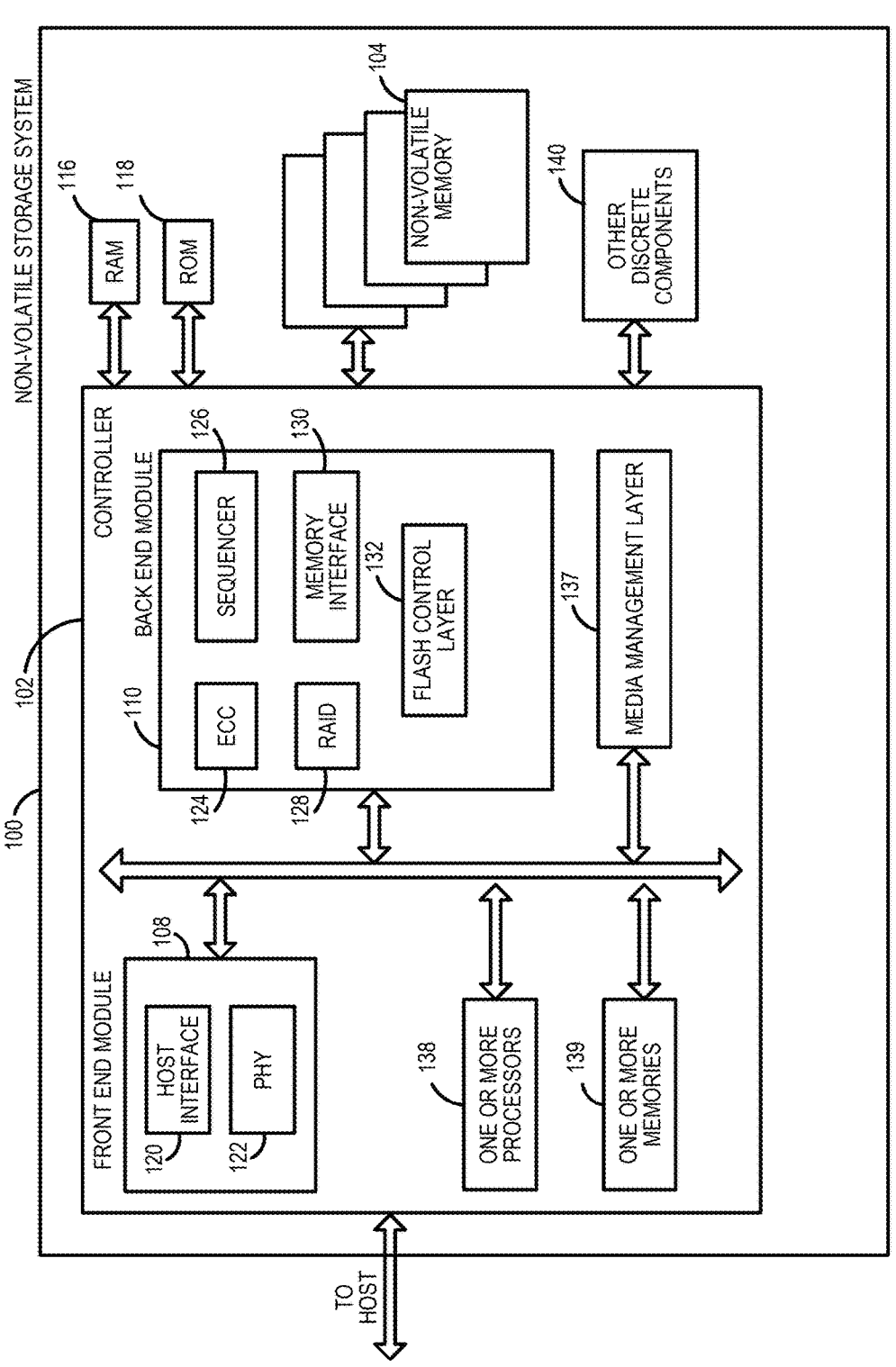
FIG. 2A is a block diagram illustrating components of the controller of the data storage device illustrated in FIG. 1A according to an embodiment.

The controller 102 (which may be a non-volatile memory controller (e.g., a flash, resistive random-access memory (ReRAM), phase-change memory (PCM), or magnetoresistive random-access memory (MRAM) controller)) can include one or more components, individually or in combination, configured to perform certain functions, including, but not limited to, the functions described herein and illustrated in the flow charts. For example, as shown in FIG. 2A, the controller 102 can comprise one or more processors 138 that are, individually or in combination, configured to perform functions, such as, but not limited to the functions described herein and illustrated in the flow charts, by executing computer-readable program code stored in one or more non-transitory memories 139 inside the controller 102 and/or outside the controller 102 (e.g., in random access memory (RAM) 116 or read-only memory (ROM) 118). As another example, the one or more components can include circuitry, such as, but not limited to, logic gates, switches, an application specific integrated circuit (ASIC), a programmable logic controller, and an embedded microcontroller.

In one example embodiment, the non-volatile memory controller 102 is a device that manages data stored on non-volatile memory and communicates with a host, such as a computer or electronic device, with any suitable operating system. The non-volatile memory controller 102 can have various functionality in addition to the specific functionality described herein. For example, the non-volatile memory controller can format the non-volatile memory to ensure the memory is operating properly, map out bad non-volatile memory cells, and allocate spare cells to be substituted for future failed cells. Some part of the spare cells can be used to hold firmware (and/or other metadata used for housekeeping and tracking) to operate the non-volatile memory controller and implement other features. In operation, when a host needs to read data from or write data to the non-volatile memory, it can communicate with the non-volatile memory controller. If the host provides a logical address to which data is to be read/written, the non-volatile memory controller can convert the logical address received from the host to a physical address in the non-volatile memory. The non-volatile memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 104 may include any suitable non-volatile storage medium, including resistive random-access memory (ReRAM), magnetoresistive random-access memory (MRAM), phase-change memory (PCM), NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC) (e.g., dual-level cells, triple-level cells (TLC), quad-level cells (QLC), etc.) or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, the data storage device 100 may be a card-based system, such as a secure digital (SD) or a micro secure digital (micro-SD) card. In an alternate embodiment, the data storage device 100 may be part of an embedded data storage device.

Although, in the example illustrated in FIG. 1A, the data storage device 100 (sometimes referred to herein as a storage module) includes a single channel between controller 102 and non-volatile memory die 104, the subject matter described herein is not limited to having a single memory channel. For example, in some architectures (such as the ones shown in FIGS. 1B and 1C), two, four, eight or more memory channels may exist between the controller and the memory device, depending on controller capabilities. In any of the embodiments described herein, more than a single channel may exist between the controller and the memory die, even if a single channel is shown in the drawings.

FIG. 1B illustrates a storage module 200 that includes plural non-volatile data storage devices 100. As such, storage module 200 may include a storage controller 202 that interfaces with a host and with data storage device 204, which includes a plurality of data storage devices 100. The interface between storage controller 202 and data storage devices 100 may be a bus interface, such as a serial advanced technology attachment (SATA), peripheral component interconnect express (PCIe) interface, double-data-rate (DDR) interface, or serial attached small scale compute interface (SAS/SCSI). Storage module 200, in one embodiment, may be a solid-state drive (SSD), or non-volatile dual in-line memory module (NVDIMM), such as found in server PC or portable computing devices, such as laptop computers, and tablet computers.

FIG. 1C is a block diagram illustrating a hierarchical storage system. A hierarchical storage system 250 includes a plurality of storage controllers 202, each of which controls a respective data storage device 204. Host systems 252 may access memories within the storage system 250 via a bus interface. In one embodiment, the bus interface may be a Non-Volatile Memory Express (NVMe) or Fibre Channel over Ethernet (FCOE) interface. In one embodiment, the system illustrated in FIG. 1C may be a rack mountable mass storage system that is accessible by multiple host computers, such as would be found in a data center or other location where mass storage is needed.

Referring again to FIG. 2A, the controller 102 in this example also includes a front-end module 108 that interfaces with a host, a back-end module 110 that interfaces with the one or more non-volatile memory die 104, and various other components or modules, such as, but not limited to, a buffer manager/bus controller module that manage buffers in RAM 116 and controls the internal bus arbitration of controller 102. A module can include one or more processors or components, as discussed above. The ROM 118 can store system boot code. Although illustrated in FIG. 2A as located separately from the controller 102, in other embodiments one or both of the RAM 116 and ROM 118 may be located within the controller 102. In yet other embodiments, portions of RAM 116 and ROM 118 may be located both within the controller 102 and outside the controller 102.

Front-end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, serially attached small computer system interface (SAS), Fibre Channel, universal serial bus (USB), PCIe, and NVMe. The host interface 120 typically facilitates transfer for data, control signals, and timing signals.

Back-end module 110 includes an error correction code (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. The controller 102 in this example also comprises a media management layer 137 and a flash control layer 132, which controls the overall operation of back-end module 110.

The data storage device 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller are optional components that are not necessary in the controller 102.

Figure 2B:
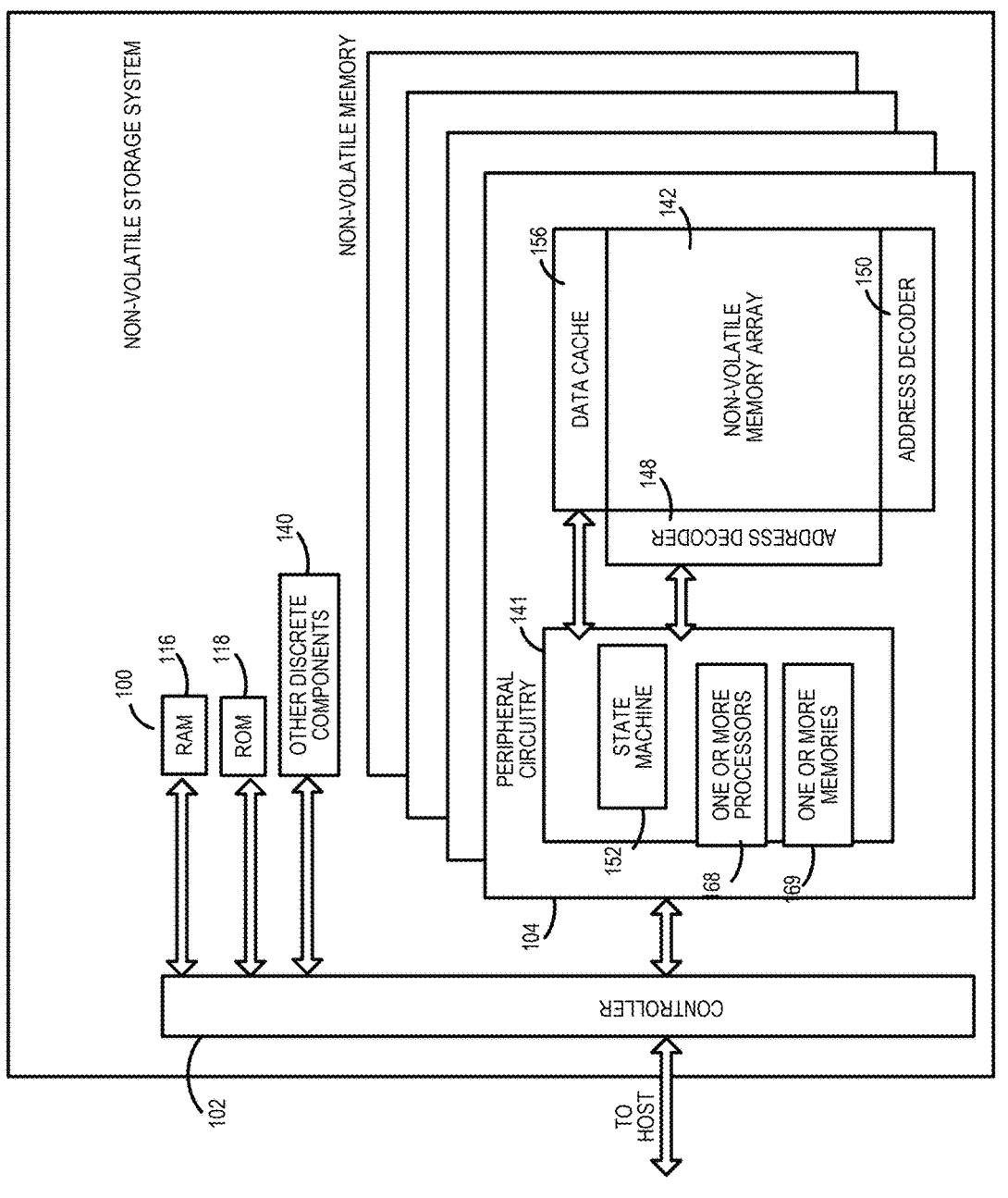
FIG. 2B is a block diagram illustrating components of the data storage device illustrated in FIG. 1A according to an embodiment.

FIG. 2B is a block diagram illustrating components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including ReRAM, MRAM, PCM, NAND flash memory cells and/or NOR flash memory cells in a two-dimensional and/or three-dimensional configuration. Non-volatile memory die 104 further includes a data cache 156 that caches data and address decoders 148, 150. The peripheral circuitry 141 in this example includes a state machine 152 that provides status information to the controller 102. The peripheral circuitry 141 can also comprise one or more components that are, individually or in combination, configured to perform certain functions, including, but not limited to, the functions described herein and illustrated in the flow charts. For example, as shown in FIG. 2B, the memory die 104 can comprise one or more processors 168 that are, individually or in combination, configured to execute computer-readable program code stored in one or more non-transitory memories 169, stored in the memory array 142, or stored outside the memory die 104. As another example, the one or more components can include circuitry, such as, but not limited to, logic gates, switches, an application specific integrated circuit (ASIC), a programmable logic controller, and an embedded microcontroller.

In addition to or instead of the one or more processors 138 (or, more generally, components) in the controller 102 and the one or more processors 168 (or, more generally, components) in the memory die 104, the data storage device 100 can comprise another set of one or more processors (or, more generally, components). In general, wherever they are located and however many there are, one or more processors (or, more generally, components) in the data storage device 100 can be, individually or in combination, configured to perform various functions, including, but not limited to, the functions described herein and illustrated in the flow charts. For example, the one or more processors (or components) can be in the controller 102, memory device 104, and/or other location in the data storage device 100. Also, different functions can be performed using different processors (or components) or combinations of processors (or components). Further, means for performing a function can be implemented with a controller comprising one or more components (e.g., processors or the other components described above).

Returning again to FIG. 2A, the flash control layer 132 (which will be referred to herein as the flash translation layer (FTL) handles flash errors and interfaces with the host. In particular, the FTL, which may be an algorithm in firmware, is responsible for the internals of memory management and translates writes from the host into writes to the memory 104. The FTL may be needed because the memory 104 may have limited endurance, may be written in only multiples of pages, and/or may not be written unless it is erased as a block. The FTL understands these potential limitations of the memory 104, which may not be visible to the host. Accordingly, the FTL attempts to translate the writes from host into writes into the memory 104.

The FTL may include a logical-to-physical address (L2P) map (sometimes referred to herein as a table or data structure) and allotted cache memory. In this way, the FTL translates logical block addresses ("LBAs") from the host to physical addresses in the memory 104. The FTL can include other features, such as, but not limited to, power-off recovery (so that the data structures of the FTL can be recovered in the event of a sudden power loss) and wear leveling (so that the wear across memory blocks is even to prevent certain blocks from excessive wear, which would result in a greater chance of failure).

Figure 3:
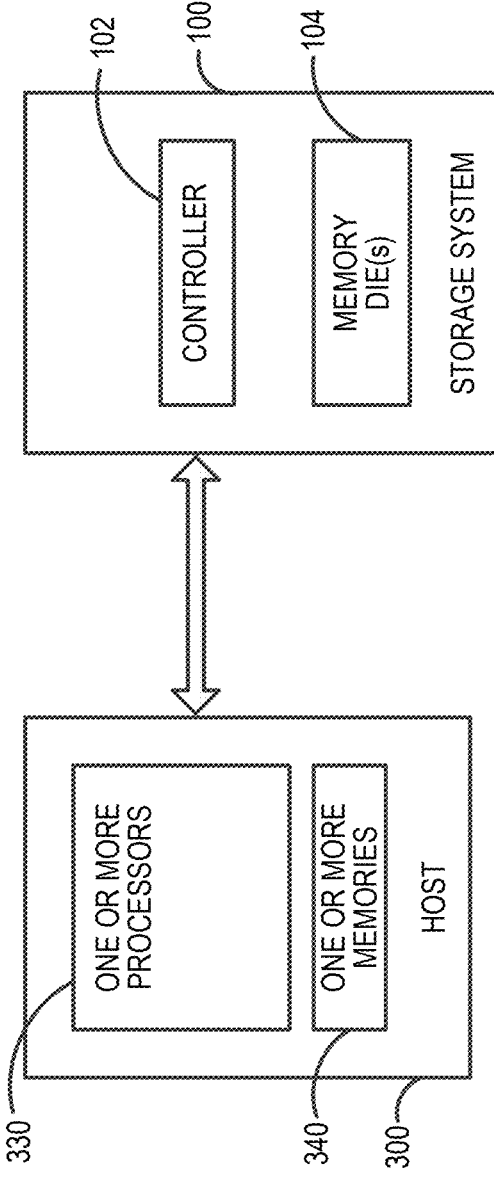
FIG. 3 is a block diagram of a host and a data storage device of an embodiment.

Turning again to the drawings, FIG. 3 is a block diagram of a host 300 and data storage device 100 of an embodiment. The host 300 can take any suitable form, including, but not limited to, a computer, a mobile phone, a tablet, a wearable device, a digital video recorder, a surveillance system, etc. The host 300 in this embodiment (here, a computing device) comprises one or more processors 330 and one or more memories 340. In one embodiment, computer-readable program code stored in the one or more memories 340 configures the one or more processors 330 to perform the acts described herein as being performed by the host 300. So, actions performed by the host 300 are sometimes referred to herein as being performed by an application (computer-readable program code) run on the host 300. For example, the host 300 can be configured to send data (e.g., initially stored in the host's memory 340) to the data storage device 100 for storage in the data storage device's memory 104.

As mentioned above, in some data storage devices (e.g., solid-state drives (SSDs)), the programming of cells in the memory can be done using incremental step pulse programming, in which a read operation is performed after each applied programming pulse to verify that the memory cell was correctly programmed. If the memory cell was not correctly programmed, another programming pulse can be applied to the memory cell followed by another verify step. This can be repeated until the memory cell is correctly programmed or until a maximum number of programming attempts has been reached. The term "nPnV" is sometimes used herein, wherein "n" refers to the maximum number of allowed programming pulses ("P") and verify read steps ("V"). In one example memory architecture, a program operation is performed on a string of memory cells (sometimes referred to herein as a logical wordline (LWL)), which is a subset of a physical wordline in the memory. It should be understood that this is merely an example and that other granularities and memory architectures can be used. As such, the details presented herein should not be read into the claims unless expressly recited therein.

It is possible that some memory cells in a memory may by suitable for a program-without-verify (e.g., 1P0V) scheme, while other memory cells in the memory may be suitable for a program-with-verify (e.g., nPnV) scheme. For example, single-level cell (SLC) blocks in "prime" memories can have relatively-reliable memory cells that are fast and easy to program with a single programming pulse. As such, a single program voltage pulse without verification (1P0V) scheme may be used as a default programming operation, thereby reducing programming time. However, some logical wordlines in the memory may be slow or difficult to program and may require an nPnV programming scheme instead of a 1P0V programming scheme. To account for this, the data storage device can store a data structure that identifies those logical wordlines for which an nPnV scheme should be used instead of the default 1P0V scheme. (In an alternate embodiment, the default is an nPnV scheme, and the data structure identifies those memory cells for which an mPmV scheme should be used, where m>n.) The data structure (e.g., a list, table, etc.), which can be common to all host static/hybrid SLC blocks, can be stored in the memory 104 or other location in the data storage device 100 and be accessible by the controller 102 (e.g., firmware).

Figure 4:
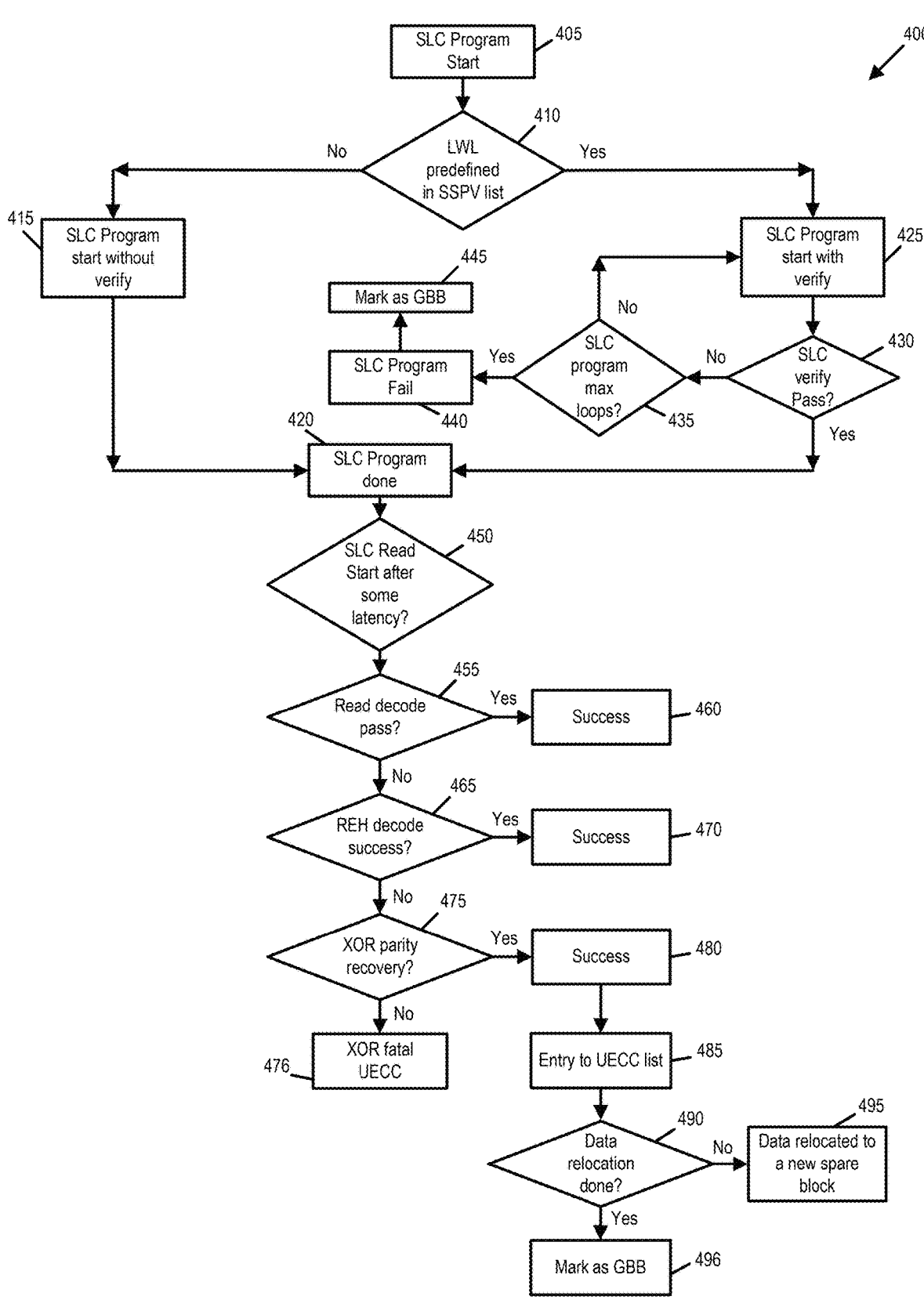
FIG. 4 is a flow chart of a programming method of an embodiment.

FIG. 4 is a flow chart 400 that illustrates this example. As shown in FIG. 4, after the SLC program start to a logical wordline in the memory 104 (405), the controller 102 determines if the logical wordline is predefined in a SLC selective program verify ("SSPV") list (410). (In this example, the phrase "SLC selective program verify ("SSPV")" is used to refer to programming an SLC logical wordline using a nPnV scheme instead of the default 1P0V scheme.) If the logical wordline is not predefined in the SSPV list, the controller 102 performs an SLC program without verify (415), and the SLC program is done (420). On the other hand, if the logical wordline is predefined in the SSPV list, the controller 102 performs an SLC program operation (425) and attempts to verify the write (430). If the write is verified, the SLC program is done (430). However, if the write is not verified, the controller 102 determines if a maximum number of SLC program loops have been performed (435). If the maximum number has not been performed, the method loops back to 425. However, if the maximum number has been performed, the SLC program fails (440), and the controller 102 marks the block as a grown bad block (GBB) (445).

After the SLC program is done, the controller 102 performs an SLC read after some latency (450) and determines if a read decode operation passes (455). If a read decode operation passes (indicating no errors in the read data), the read operation is a success (460). If the read decode operation fails, a read error handling (REH) decode operation is performed to correct errors in the data, and the controller 102 checks to see if the REH decode operation was successful (465). If it was, the read operation is a success (470). If it was not, the controller 102 attempts an exclusive-or (XOR) recovery operation and determines if that operation was successful (475). If the XOR recovery operation was not successful, a fatal uncorrectable error has occurred (476). If the XOR recovery operation was successful, the read operation is a success (488). However, as the data may not be reliably read in the future, the controller 102 enters the logical wordline in an uncorrectable error correction code (UECC) list (486) and attempts to relocate the data. The controller 102 then determines if the data was relocated successfully (490). If the data was not relocated successfully, the data is relocated to a new spare block (495). When the data is relocated successfully, the block comprising the logical wordline is marked as a grown bad block (496) and will not be used again.

As seen by the above example, a programmed logical wordline, even if the programming is verified, might not be reliably read in the future (e.g., due to cycling/usage of a block or due to a process issue). In the above example, when this occurs (e.g., after failure of a read-error handling operation), the block that contains the unreliable logical wordline is marked as bad and not used again. However, that logical wordline, if initially programmed using 1P0V, may be reliable if programmed using nPnV. Even if that logical wordline is still unreliable, it is possible that other logical wordlines in the block may be reliable. Thus, prematurely marking a block as a grown bad block can adversely impact the block budget because a new block from the spare pool is used when it may not really be needed.

To address this situation, in another embodiment, instead of retiring the entire block, the unreliable logical wordline is added to the SSPV list. In one example implementation, two SSPV lists are used: a static list (which contains the set of initially-identified unreliable logical wordlines) and a dynamic list (which contains newly-discovered unreliable logical wordlines). The use of the dynamic list allows only the unreliable logical wordlines-and not the entire block-to be retired. However, if additional logical wordlines in the block become reliable, the entire block can be retired, and the unreliable logical wordlines that were previously added to the dynamic list can be removed. An unreliable logical wordline can be added to the dynamic SSPV list in any suitable way. In one example implementation, the controller 102 can append the list of logical wordlines of a particular block with the virtual block address (VBA) that can be used later to identify the physical location of the "converted" logical wordlines for the next program operation.

Figure 5:
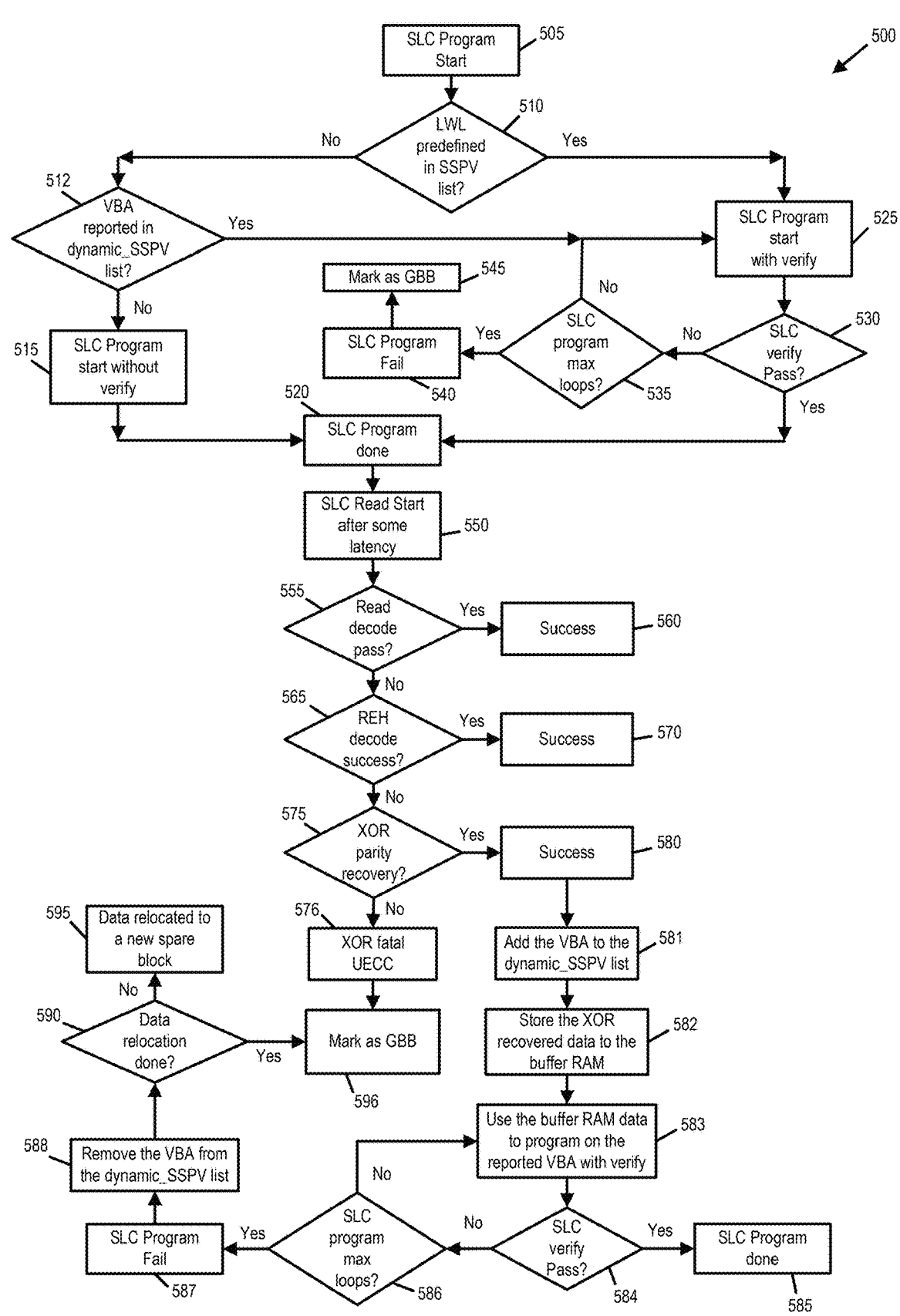
FIG. 5 is a flow chart of a programming method of an embodiment.

FIG. 5 is a flow chart 500 that illustrates an example of this embodiment. As shown in FIG. 5, after the SLC program start (505), the controller 102 determines if the logical wordline is predefined in the SSPV list (510). If the logical wordline is predefined in the SSPV list, the controller 102 performs an SLC program operation (525) and attempts to verify the write (530). If the write is verified, the SLC program is done (520). However, if the write is not verified, the controller 102 determines if a maximum number of SLC program loops have been performed (535). If the maximum number has not been performed, the method loops back to 525. However, if the maximum number has been performed, the SLC program fails (540), and the controller 102 marks the block as a grown bad block (545). On the other hand, if the logical wordline is not predefined in the SSPV list, the controller 102 determines if the virtual block address is reported in a dynamic SSPV list (512). If it is, the method proceeds to 525. If it is not, the controller 102 performs an SLC program without verify (515), and the SLC program is done (520).

After the SLC program is done, the controller 102 performs an SLC read after some latency (550) and determines if a read decode operation passes (555). If the read decode operation passes (indicating no errors in the read data), the read operation is a success (560). If the read decode operation fails, a read error handling (REH) decode operation is performed to correct errors in the data, and the controller 102 checks to see if the REH decode operation was successful (565). If it was, the read operation is a success (570). If it was not, the controller 102 attempts an exclusive-or (XOR) recovery operation and determines if that operation was successful (575). If the XOR recovery operation was not successful, a fatal uncorrectable error has occurred (576), and the block is marked as a grown bad block (596). If the XOR recovery operation was successful, the read operation is a success (580). However, as the data may not be reliably read in the future, the controller 102 adds the virtual block address to a dynamic SSPV list (581) and stores the XOR recovered data in a buffer RAM (or other memory) (582). The controller 102 then use the buffer RAM data to program the reported virtual block address with verify (583) and determines whether the SLC verify passes (582). If it does, the SLC program is done (585). If it does not, the controller 102 determines if a maximum number of SLC program loops have been performed (588). If the maximum number has not been performed, the method loops back to 583. However, if the maximum number has been performed, the SLC program fails (587), and the controller 102 removes the virtual block address from the dynamic SSPV list (588). The controller 102 then determines if the data was relocated (590). If it was not, the data is relocated to a new spare block (595). If it was, the block is marked as a grown bad block (596).

So, in this example, when reading a page from a static/hybrid host SLC block, if the read failure is observed even after utilizing REH, an XOR parity scheme is used to attempt to recover the data. If the data is recovered, the virtual block address will be moved to the dynamic SSPV list. The controller 102 can try to program the reported virtual block address again with the nPnV scheme. If this attempt is successful, the controller 102 can use the dynamic SSPV list to access the reported virtual block address for future program operations. If this attempt is not successful, the block can be marked as a grown bad block, and the full block data can be relocated to a new block.

Subsequently, the reported virtual block address can be removed from the dynamic SSPV list. If the data is not recovered by XOR parity scheme, the data is lost permanently, and the block will be marked as a grown bad block. Similarly, utilizing the remembrance of the dynamic SSPV list, fresh data can be programmed. While programming the logical wordlines that are not listed in the static SSPV list, the dynamic SSPV list can be accessed to decide whether a 1P0V or nPnV programming scheme for a selected logical wordline should be used. If the logical wordline is already in the dynamic SSPV list, the nPnV scheme can be used; otherwise, the 1P0V scheme can be used.

Finally, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/or over a substrate may be arranged in two or three dimensions, such as a two-dimensional memory structure or a three-dimensional memory structure.

In a two-dimensional memory structure, the semiconductor memory elements are arranged in a single plane or a single memory device level. Typically, in a two-dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and wordlines.

A three-dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three-dimensional memory structure may be vertically arranged as a stack of multiple two-dimensional memory device levels. As another non-limiting example, a three-dimensional memory array may be arranged as multiple vertical columns (e.g., columns extending substantially perpendicular to the major surface of the substrate, i.e., in the y direction) with each column having multiple memory elements in each column. The columns may be arranged in a two-dimensional configuration, e.g., in an x-z plane, resulting in a three-dimensional arrangement of memory elements with elements on multiple vertically stacked memory planes. Other configurations of memory elements in three dimensions can also constitute a three-dimensional memory array.

By way of non-limiting example, in a three-dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three-dimensional configurations can be envisioned wherein some NAND strings contain memory elements in a single memory level while other strings contain memory elements which span through multiple memory levels. Three-dimensional memory arrays may also be designed in a NOR configuration and in a ReRAM configuration.

Typically, in a monolithic three-dimensional memory array, one or more memory device levels are formed above a single substrate. Optionally, the monolithic three-dimensional memory array may also have one or more memory layers at least partially within the single substrate. As a non-limiting example, the substrate may include a semiconductor such as silicon. In a monolithic three-dimensional array, the layers constituting each memory device level of the array are typically formed on the layers of the underlying memory device levels of the array. However, layers of adjacent memory device levels of a monolithic three-dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three-dimensional memory arrays. Further, multiple two-dimensional memory arrays or three-dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three-dimensional structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the embodiments described herein can be used alone or in combination with one another.

What is claimed is:

1. In a data storage device comprising a memory, a method comprising:
    determining whether a logical wordline is identified in a static program verify data structure as requiring a read verification operation be performed after attempting to program the logical wordline;
    in response determining that the logical wordline is not identified in the static program verify data structure, determining whether the logical wordline is identified in a dynamic program verify data structure as requiring the read verification operation be performed after attempting to program the logical wordline; and
    in response determining that the logical wordline is not identified in the dynamic program verify data structure, programming the logical wordline without performing the read verification operation.

2. The method of claim 1, further comprising:
    performing the read verification operation after programming the logical wordline in response to the logical wordline not being identified in either the static program verify data structure and the dynamic program verify data structure.

3. The method of claim 1, further comprising:
    reading the logical wordline after the logical wordline has been programmed;
    performing a read error handling operation on data read from the logical wordline; and
    in response to the read error handling operation being unsuccessful, adding an identification of the logical wordline to the dynamic program verify data structure.

4. The method of claim 3, further comprising:
    recovering the data;
    attempting to program the recovered data in another logical wordline; and
    in response to a failure to program the recovered data in the another logical wordline, removing the identification of the logical wordline from the dynamic program verify data structure.

5. The method of claim 4, wherein:
    the logical wordline and the another logical wordline are in a block; and
    the method further comprises identifying the block as a bad block.

6. The method of claim 4, further comprising:
    performing an exclusive-or (XOR) operation to recover the data.

7. The method of claim 4, further comprising:
    storing the recovered data in a buffer memory; and
    attempting to program the recovered data from the buffer memory to the another logical wordline.

8. The method of claim 1, wherein the logical wordline is identified in the dynamic program verify data structure as a virtual block address.

9. The method of claim 1, wherein the logical wordline is part of a single-level cell (SLC) block.

10. The method of claim 1, wherein the memory comprises a three-dimensional memory.

11. A data storage device comprising:
    a memory; and
    means for:
        determining whether a string of memory cells is identified in a first data structure as requiring a read verification operation be performed after attempting to program the string of memory cells;
        in response determining that the string of memory cells is not identified in the first data structure, determining whether the string of memory cells is identified in a second data structure as requiring the read verification operation be performed after attempting to program the string of memory cells; and
        in response determining that the string of memory cells is not identified in the second data structure, programming the string of memory cells without performing the read verification operation.

12. A data storage device comprising:
    a memory; and
    one or more processors, individually or in combination, configured to:
        determine whether a logical wordline is identified in a static program verify data structure as requiring a read verification operation be performed after attempting to program the logical wordline;
        in response determining that the logical wordline is not identified in the static program verify data structure, determine whether the logical wordline is identified in a dynamic program verify data structure as requiring the read verification operation be performed after attempting to program the logical wordline; and
        in response determining that the logical wordline is not identified in the dynamic program verify data structure, program the logical wordline without performing the read verification operation.

13. The data storage device of claim 12, wherein the one or more processors, individually or in combination, are further configured to:

perform the read verification operation after programming the logical wordline in response to the logical wordline not being identified in either the static program verify data structure and the dynamic program verify data structure.

14. The data storage device of claim 12, wherein the one or more processors, individually or in combination, are further configured to:

read the logical wordline after the logical wordline has been programmed;

perform a read error handling operation on data read from the logical wordline; and in response to the read error handling operation being unsuccessful, add an identification of the logical wordline to the dynamic program verify data structure.

15. The data storage device of claim 14, wherein the one or more processors, individually or in combination, are further configured to:

recover the data;

attempt to program the recovered data in another logical wordline; and in response to a failure to program the recovered data in the another logical wordline, remove the identification of the logical wordline from the dynamic program verify data structure.

16. The data storage device of claim 15, wherein:

the logical wordline and the another logical wordline are in a block; and the one or more processors, individually or in combination, are further configured to identify the block as a bad block.

17. The data storage device of claim 15, wherein the one or more processors, individually or in combination, are further configured to:

perform an exclusive-or (XOR) operation to recover the data.

18. The data storage device of claim 15, wherein the one or more processors, individually or in combination, are further configured to:

store the recovered data in a buffer memory; and attempt to program the recovered data from the buffer memory to the another logical wordline.

19. The data storage device of claim 12, wherein the logical wordline is identified in the dynamic program verify data structure as a virtual block address.

20. The data storage device of claim 12, wherein the logical wordline is part of a single-level cell (SLC) block.

* * * * *